United States Patent [19]

Baum

[11] Patent Number: 5,413,168
[45] Date of Patent: May 9, 1995

[54] CLEANING METHOD FOR HEAT EXCHANGERS

[75] Inventor: Allen J. Baum, Pittsburgh, Pa.

[73] Assignee: Westinghouse Electric Corporation, Pittsburgh, Pa.

[21] Appl. No.: 105,571

[22] Filed: Aug. 13, 1993

[51] Int. Cl.⁶ ............................ F28G 9/00; B08B 9/02; F22B 37/48
[52] U.S. Cl. ........................................ 165/95; 122/379; 134/22.13; 134/22.16; 134/26; 376/316
[58] Field of Search .................. 165/95; 122/379, 381, 122/383; 134/22.11, 22.12, 22.18, 22.16, 22.13, 26; 376/316

[56] References Cited

U.S. PATENT DOCUMENTS

| | | | |
|---|---|---|---|
| 3,438,811 | 4/1969 | Harriman et al. | 134/2 |
| 3,527,609 | 9/1970 | Vinso | 134/26 X |
| 4,578,162 | 3/1986 | McIntyre et al. | 134/26 X |
| 4,632,705 | 12/1986 | Baum | 134/3 |
| 4,645,542 | 2/1987 | Scharton et al. | 134/1 |
| 4,655,846 | 4/1987 | Scharton et al. | 134/1 |
| 4,666,528 | 5/1987 | Arrington et al. | 134/28 X |
| 4,686,067 | 8/1987 | Veysset et al. | 376/310 |
| 4,699,665 | 10/1987 | Scharton et al. | 134/1 |
| 4,720,306 | 1/1988 | Emmert et al. | 134/3 |
| 4,756,770 | 7/1988 | Weems et al. | 134/137 |
| 4,789,406 | 12/1988 | Holder et al. | 134/22.16 X |
| 4,899,697 | 2/1990 | Franklin et al. | 122/379 |
| 4,921,662 | 5/1990 | Franklin et al. | 376/316 |
| 4,972,805 | 11/1990 | Weems | 122/383 |
| 5,006,304 | 4/1991 | Franklin et al. | 376/316 |
| 5,019,329 | 5/1991 | Franklin et al. | 376/316 |
| 5,092,280 | 3/1992 | Franklin et al. | 122/379 |
| 5,154,197 | 10/1992 | Auld et al. | 134/22.11 X |

OTHER PUBLICATIONS

Kuehn, Steven E., entitled "Better Maintenance, R&D Extend Steam Generator Life", *Power Engineering*, Oct., 1992, pp. 29–32.

Primary Examiner—John Rivell
Assistant Examiner—L. R. Leo
Attorney, Agent, or Firm—David G. Maire

[57] ABSTRACT

An improved method for cleaning heat exchangers, wherein a first liquid containing a cleaning agent is used to remove substantially all of the accumulated sludge and deposits from the surfaces of the heat exchanger, and a second liquid containing a cleaning agent is used to remove deposits from the crevice regions of the heat exchanger. The concentration of cleaning agent in the second liquid and/or the duration of exposure for the second liquid are preferably greater than those of the first liquid, because the risk of corrosion is reduced as a result of a lower concentration of ferric ions in the second liquid. Furthermore, improved crevice region cleaning is obtained with the second liquid because the available cleaning agent is not depleted by the large volume of sludge and deposits removed by the first liquid. Mechanical cleaning techniques such as pressure pulse cleaning may be utilized with either or both of the cleaning liquids. Additional liquids may be introduced into the heat exchanger to provide further cleaning action or to facilitate flushing of the previous cleaning liquids.

19 Claims, 2 Drawing Sheets

CLEANING METHOD FOR HEAT EXCHANGERS

BACKGROUND OF THE INVENTION

This invention relates generally to the cleaning of the interior of vessels, and is specifically concerned with the cleaning of sludge, debris and deposits from the shell side of a heat exchanger which has crevice regions. This invention has particular application to the cleaning of nuclear steam generators where the sludge and debris may be radioactive and where deposits in crevice regions may be particularly detrimental to the longevity of the steam generator.

There are many methods known in the prior art for cleaning heat exchangers. Among the known methods are the chemical cleaning processes taught in U.S. Pat. No. 4,686,067 entitled "Process for Eliminating Deposits Formed in a Steam Generator of a Pressurized Water Nuclear Reactor" and U.S. Pat. No. 4,720,306 entitled "Cleaning Method". Chemical cleaning techniques are limited by concerns regarding corrosion of the heat exchanger components. Cleaning agents which are effective in dissolving deposits are generally detrimental to the structures of the heat exchanger. Therefore, the concentration of the cleaning agent and the duration of the cleaning process are typically limited. Furthermore, because the concentration of the cleaning solution is limited, depletion of the active cleaning solution prior to complete cleaning of the crevice regions is common. In order to increase the concentration of cleaning solution in the crevice regions, U.S. Pat. No. 4,632,705 entitled "Process for the Accelerated Cleaning of the Restricted Areas of the Secondary Side of a Steam Generator" teaches a process which induces flash boiling of the cleaning solution by a reduction of pressure in the heated cleaning solution. However, the effectiveness of this technique is also limited when the concentration of active cleaning solution is depleted in the bulk solution.

Mechanical cleaning methods avoid the corrosion concern of the chemical methods. Among the mechanical methods known in the prior art are U.S. Pat. No. 4,756,770 entitled "Water Slap Steam Generator Cleaning Method" and U.S. Pat. No. 4,972,805 entitled "Method and Apparatus for Removing Foreign Matter from Heat Exchanger Tubesheets" and U.S. Pat. No. 5,006,304 entitled "Pressure Pulse Cleaning Method". Such mechanical methods are limited by the amount of force which can be exerted on the accumulated sludge and deposits without creating damage to the structures of the heat exchanger.

SUMMARY OF THE INVENTION

In light of the limitations of the prior art discussed above, it is an object of this invention to provide a method for cleaning heat exchangers which provides effective removal of sludge and deposits from the surfaces of the interior of a heat exchanger as well as from the crevice regions of the heat exchanger interior, and to do so without excessive corrosion or mechanical damage to the heat exchanger components.

This invention discloses a method for cleaning the interior of a vessel having crevice regions therein, including the steps of introducing a first liquid containing a cleaning agent into the vessel, the first liquid being operative to remove substantially all of the sludge and deposits accumulated on the interior surfaces of the vessel; removing the first liquid from the vessel; introducing a second liquid containing a cleaning agent into the vessel, wherein essentially all of the cleaning agent in the second liquid is available for cleaning of deposits in the crevice regions of the vessel, and finally removing the second liquid from the vessel. A series of pressure waves may be generated within either of the cleaning liquids in order to facilitate the loosening and removal of sludge and deposits. The concentration of cleaning agent in the second liquid can preferably be greater than that in the first liquid because the risk of corrosion is less as a result of a lower concentration of ferric ions within the second liquid.

DESCRIPTION OF THE PREFERRED EMBODIMENTS

Figure 1:
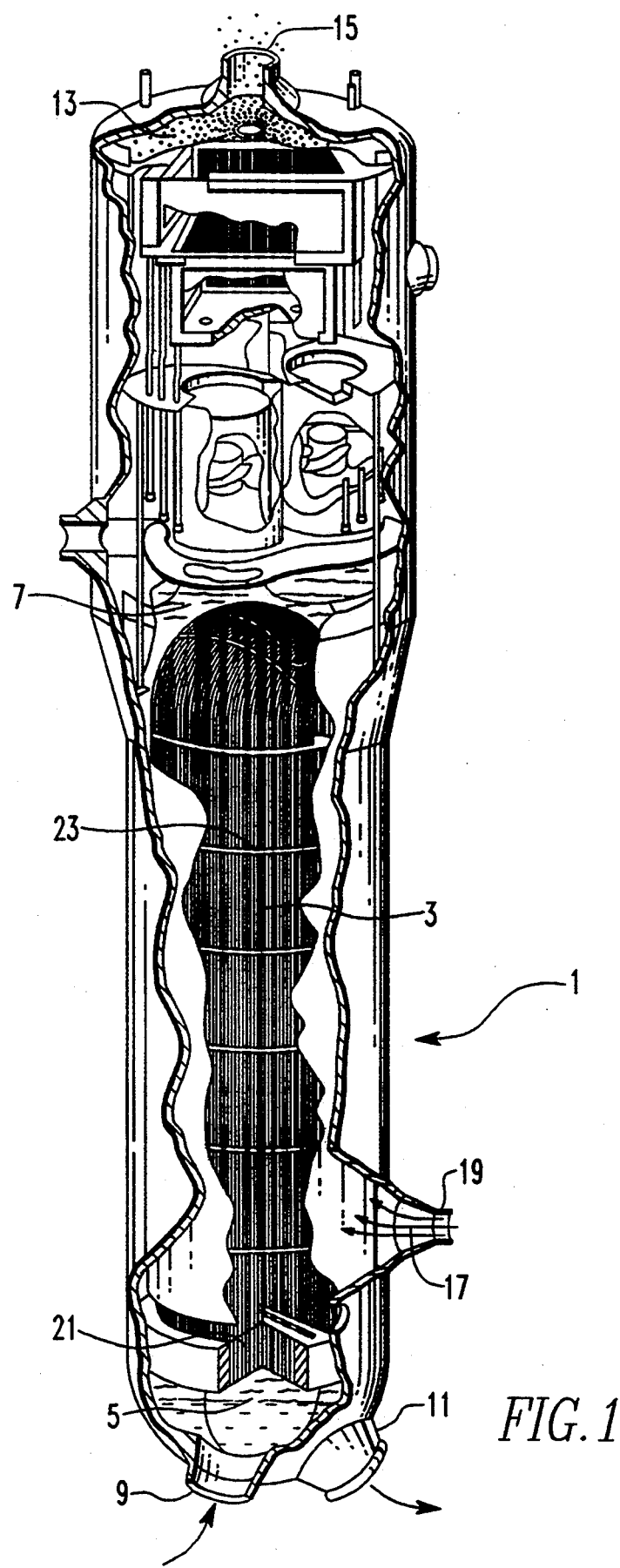
FIG. 1 illustrates a nuclear plant steam generator which can be cleaned by the method of this invention.

FIG. 1 illustrates a steam generating heat exchanger 1 which is typical of the vessels which can be cleaned by this invention. The heat exchanger of FIG. 1 contains numerous tubes 3, in this case U-shaped tubes, which serve as a pressure boundary between primary fluid 5 on the inside of the tubes and secondary fluid 7 surrounding the outside of the tubes. In a nuclear power plant, primary coolant water 5 which is heated in the reactor is supplied to the steam generator 1 via an inlet nozzle 9. This water travels through the tubes, thereby transferring heat energy to secondary water 7 contained in the shell side of the steam generator 1. After traversing the tubes, the primary water 5 exits the steam generator 1 via an outlet nozzle 11. The water 7 in the secondary side of the steam generator 1 is at a lower pressure than the water 5 in the primary side, and it is boiled by the hot primary side fluid 5, thereby providing steam 13 to the turbine/generator via a steam outlet nozzle 15. The shell side of the steam generating heat exchanger 1 is a natural collection point for sludge and debris. As the water 7 in the steam generator 1 is converted to steam 13 and exits the heat exchanger 1, it is resupplied by makeup water 17 through a feedwater nozzle 19. Any solids mixed with the makeup water 17 which are not volatile will accumulate in the secondary side of the heat exchanger 1. Furthermore, solids may be collected by precipitating from solution. Sludge and deposits will accumulate in any regions of low flow, such as the crevice region 21 between a tube and the tube sheet, or the crevice region 23 between a tube and a tube support plate.

Sludge and deposit accumulations are undesirable because they interfere with the heat transfer process and because they provide low flow regions which can serve to accelerate corrosion of the heat exchanger components. Accumulated sludge and deposits may be removed from the heat exchanger during scheduled maintenance outages. Mechanical techniques for loosening the sludge are limited by the amount of force which can safely be exerted on the heat exchanger components. Chemical cleaning agents are often ineffective in penetrating the deposits located within crevice regions because the amount of active cleaning agent in solution is depleted by the large surface area of deposits and sludge available to the cleaning solution in the bulk volume of the heat exchanger.

Figure 2:
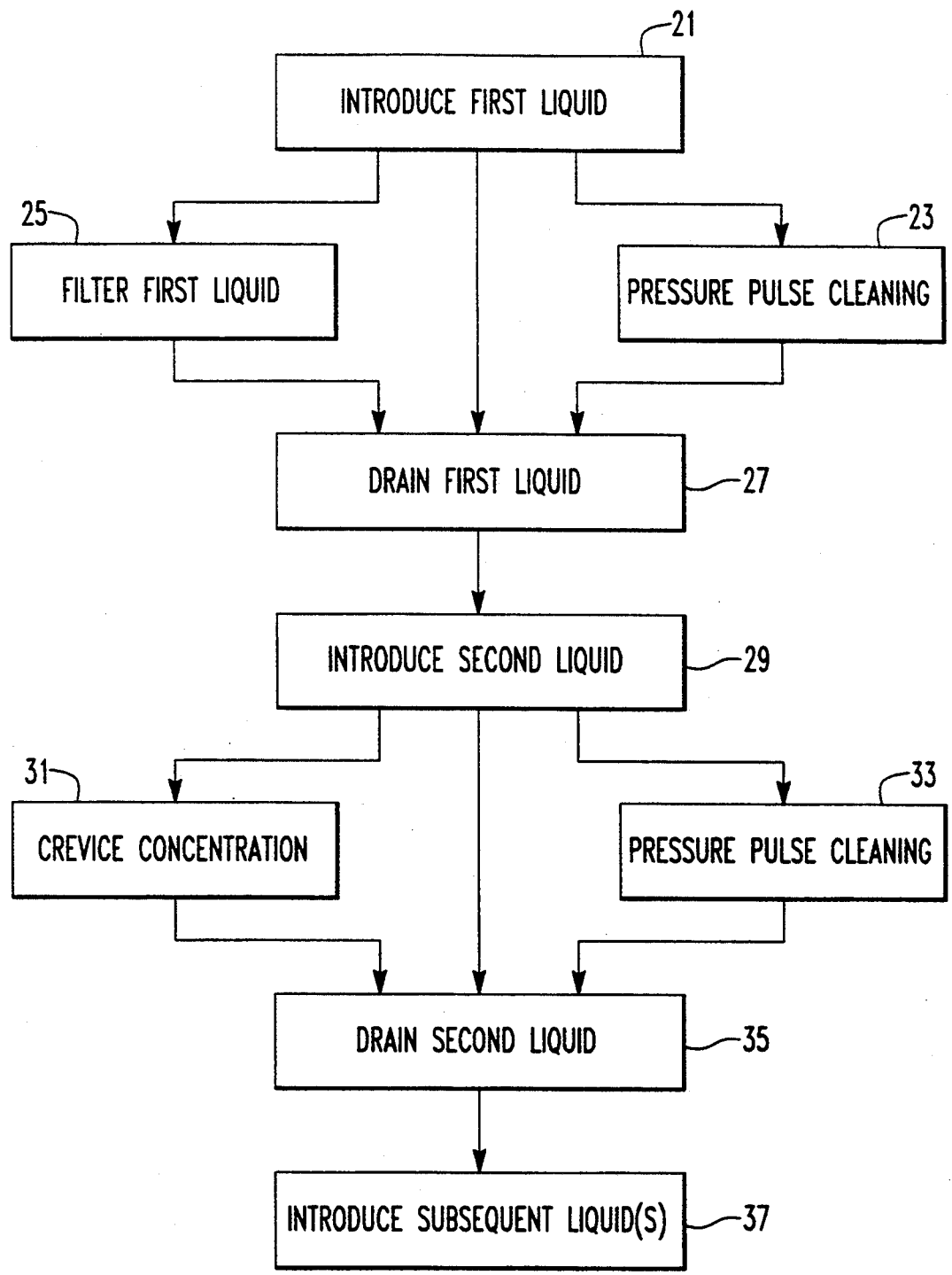
FIG. 2 is a flow chart illustrating the steps of a cleaning method performed in accordance with this invention.

An improved method of cleaning a heat exchanger is illustrated by the flow chart of FIG. 2. The first step 21 of this improved process is to introduce a first liquid containing a cleaning agent in the heat exchanger. The liquid is typically water, and the cleaning agent may be one or more chemicals known in the art; for example, EDTA, NTA, or gluconic acid. Typical concentrations of the cleaning agent may be from approximately 2% to 10% by weight, and are preferably from approximately 5% to 8% by weight.

In order to facilitate the loosening and removal of sludge and deposits, a step 23 may be included to generate a series of pressure waves or pulses in the first liquid to provide a mechanical cleaning action. This type of mechanical cleaning is often referred to as pressure pulse cleaning, and it is more fully described in U.S. Pat. No. 5,006,304, issued to Franklin et al., assigned to Westinghouse Electric Corporation, and incorporated herein by reference.

Once portions of the sludge and deposits are loosened, they are typically dissolved by the action of the chelant. In some situations, it may be desirable to include a filtering step 25 to remove particles of the sludge and deposits by recirculating the first liquid through a filtering system. Particles of sludge and deposits will be entrained in the flowing liquid and can be transported out of the heat exchanger by any recirculation system known in the art. One such recirculation system is described in U.S. Pat. No. 5,019,329 issued to Franklin et al., assigned to Westinghouse Electric Corporation, and incorporated by reference herein.

Because of the large amount of sludge and deposits normally found in a heat exchanger, sufficient cleaning solution must be provided to prevent its depletion. The effectiveness of the free chelant in a cleaning solution decreases as the inventory of complexed chelant increases. Furthermore, as the sludge and deposits are dissolved, the level of ferric ions in the first liquid will rise. Ferric ions are undesirable because they tend to aggravate the corrosion of the heat exchanger components. Because of the large volume of sludge and deposits, the first liquid will become less effective as a cleaning agent and increasingly harmful as a corrosion catalyst. Therefore, the next step 27 in the improved cleaning process is to remove the first liquid from the heat exchanger, preferably by draining the liquid through the recirculation system while maintaining the mechanical agitation caused by the pressure pulse waves. For a typical application of this process in a nuclear power plant steam generator, the preferred duration of exposure of the heat exchanger to the first liquid may be from approximately 2 to 10 hours.

At this stage of the cleaning process the majority of the sludge and surface deposits will have been removed from the heat exchanger. However, the deposits in the crevice regions may not have been completely removed because of the depletion of the active cleaning agents in the first liquid. The next step 29 in this improved cleaning process is therefore to introduce a second liquid into the heat exchanger. The second liquid is also typically water and it may contain any one or more of the cleaning agents known in the art. Since the majority of sludge and deposits were removed with the first liquid, there will be a minimum of ferric ions released into the second liquid. As a result, the concentration of cleaning agents can be higher in the second liquid than that used in the first liquid, since corrosion concerns are reduced. Typical second liquid cleaning agent concentrations are on the order of twice the concentration used with the first liquid, and they may range from approximately 4% to 20%. Furthermore, the length of time of exposure of the heat exchanger to the second liquid can be longer than the exposure to the first liquid. Typical durations of exposure to the second liquid may be from approximately 4 to 24 hours. The duration selected should be adequate for penetration of the second liquid into the crevice regions. Since the concentration of active cleaning solvent is not being depleted by a large volume of sludge and deposits, essentially all of the solvent in the second liquid is available for dissolution and/or entrainment of the crevice deposits. In order to increase the concentration of solvent in the crevice regions, the technique taught in U.S. Pat. No. 4,632,705, incorporated by reference herein, may be used as a next step 31. With this technique, the second liquid is heated, then its pressure reduced to induce flash boiling within the crevice regions. The boiling action concentrates the cleaning agent in the crevice regions when compared to the concentration in the bulk of the second liquid.

A further step 33 of mechanical cleaning action may also be utilized while the second liquid is contained in the heat exchanger. Any of the mechanical cleaning techniques known in the art may be used, for example, pressure pulse or water slap techniques.

The second liquid is then removed from the heat exchanger in step 35. Further steps 37 of introducing additional liquids into the heat exchanger in succession may be utilized as necessary for further cleaning and/or flushing; for example, for a copper removal step. If additional liquids are used for cleaning, the concentration of cleaning agents and/or the duration of exposure of the heat exchanger to the cleaning agent can be increased for each succeeding liquid, since the heat exchanger will become increasingly clean as total inventory of sludge and deposits is gradually removed from the heat exchanger by the successive liquids. This reduction of sludge results in a reduction of free ferric ions, thereby reducing the potential for galvanic corrosion of the heat exchanger components from the successively higher concentrations of cleaning agents.

In addition to providing improved crevice cleaning, this process also simplifies the waste handling associated with the cleaning of nuclear plant heat exchangers. The first liquid has a relatively low concentration of cleaning agent, and it can be handled with conventional nuclear steam generator chemical cleaning waste processing technology. The second liquid, which likely has a higher concentration of cleaning agent, can be treated as a chemical waste rather than as a mixed waste, since essentially all of the radioactivity is removed with the first liquid.

This disclosure reveals the preferred embodiment of the invention. However, variations in the form, construction, or arrangement of the invention, and the modified application of the invention are possible without departing from the scope of the invention as claimed.

I claim:

1. A method for cleaning the interior of a vessel having interior surfaces and crevice regions therein, comprising the steps of:

introducing a first liquid containing a cleaning agent into said vessel, said first liquid being operative to remove substantially all of the sludge and deposits accumulated on said interior surfaces;

removing said first liquid from said vessel;

introducing a second liquid containing a cleaning agent into said vessel, wherein essentially all of the cleaning agent in said second liquid is available for cleaning of deposits in said crevice regions; and removing said second liquid from said vessel.

2. The method of claim 1, wherein the concentration of cleaning agent in said second liquid is greater than the concentration of cleaning agent in said first liquid.

3. The method of claim 2, further comprising the step introducing a third liquid into said vessel, said third liquid containing a concentration of cleaning agent greater than said first liquid.

4. The method of claim 1, further comprising the step of generating a series of pressure waves within said first liquid, said pressure waves operative to loosen said sludge and debris from said interior surfaces.

5. The method of claim 4, further comprising the step of generating a series of pressure waves within said second liquid.

6. A method for cleaning the interior of a heat exchanger, comprising the steps of:

introducing a first liquid containing a cleaning agent into said heat exchanger;

removing said first liquid from said heat exchanger;

introducing a second liquid containing a cleaning agent into said heat exchanger, said second liquid having a higher concentration of cleaning agent than said first liquid; and removing said second liquid from said heat exchanger.

7. The method of claim 6, further comprising the step of generating a series of pressure waves within said first liquid.

8. The method of claim 6, wherein the time of exposure of said heat exchanger interior to said second liquid is greater than the time of exposure of said heat exchanger interior to said first liquid.

9. The method of claim 6, further comprising the steps of:

heating said second liquid while maintaining sufficient pressure to prevent boiling of said second liquid;

reducing the pressure of said second liquid so as to cause flash boiling within said crevice regions of said heat exchanger interior;

maintaining said reduced pressure for a period of time sufficient to concentrate the cleaning agent of said second liquid in said crevice regions; and increasing the pressure of said second liquid to terminate said boiling.

10. The method of claim 6, further comprising the step of introducing a third liquid containing a cleaning agent into said heat exchanger, said third liquid having a higher concentration of cleaning agent than said first liquid.

11. A method of cleaning a heat exchanger having interior surfaces and crevice regions therein, comprising the steps of:

introducing a first liquid containing a cleaning agent into said heat exchanger, wherein the concentration of said cleaning agent is sufficient to remove substantially all of the sludge and deposits from said interior surfaces of said heat exchanger;

generating a succession of pressure waves within said first liquid to loosen debris and deposits from said heat exchanger interior surfaces;

removing said first liquid from said heat exchanger;

introducing a second liquid containing a cleaning agent into said heat exchanger;

maintaining said second liquid within said heat exchanger for a time sufficient to remove deposits from said crevice regions; and removing said second liquid from said heat exchanger.

12. The method of claim 11, wherein said second liquid contains a higher concentration of cleaning agent than said first liquid.

13. The method of claim 11, wherein the time of exposure of said heat exchanger interior to said second liquid is greater than the time of exposure of said heat exchanger interior to said first liquid.

14. A method for cleaning the interior of a vessel having crevice regions therein, comprising the steps of introducing a succession of at least two liquids into the interior of said vessel, said succession of liquids containing concentrations of cleaning agents which increase with each succeeding liquid as the inventory of sludge and deposits contained within said vessel is reduced by the removal of each succeeding liquid.

15. A method for cleaning the interior of a vessel having crevice regions therein, comprising the steps of introducing a succession of at least two cleaning liquids into the interior of said vessel, wherein the duration of exposure of said vessel to said cleaning liquids is increased for each succeeding liquid as the inventory of sludge and deposits contained within said vessel is reduced by the removal of each succeeding liquid.

16. A method of cleaning the crevices on the shell side of a radioactive steam generator having surfaces and crevices comprising the steps of:

introducing a first liquid containing a cleaning agent into said shell side of said steam generator, said first liquid containing a sufficient amount of cleaning agent to remove substantially all of the deposits from said surfaces;

maintaining said first liquid within said steam generator a sufficient time to remove substantially all of the deposits from said surfaces;

draining said first liquid and said substantially all of the deposits from said surfaces from said steam generator;

introducing a second liquid containing a cleaning agent into said shell side of said steam generator, said second liquid containing a sufficient amount of cleaning agent to remove substantially all of the deposits from said crevices;

maintaining said second liquid within said steam generator a sufficient time to remove substantially all of the deposits from said crevices;

draining said second liquid from said steam generator.

17. The method of claim 16, further comprising the step of disposing of said second liquid as a chemical waste rather than as a mixed waste.

18. The method of claim 16, wherein the step of maintaining said first liquid within said steam generator is approximately 2 to 10 hours in duration, and the step of maintaining said second liquid within said steam generator is approximately 4 to 24 hours in duration.

19. The method of claim 16, wherein the concentration of cleaning agent in said second liquid is approximately twice the concentration of cleaning agent in said first liquid.

* * * * *